US012743631B2

(12) United States Patent
Das et al.

(10) Patent No.: US 12,743,631 B2
(45) Date of Patent: Sep. 22, 2026

(54) SUSTAINABLE AND SELF-ADAPTIVE FEDERATED DIGITAL TWIN FRAMEWORK

(71) Applicant: Accenture Global Solutions Limited, Dublin (IE)

(72) Inventors: Sankar Narayan Das, Barrackpore (IN); Kanchanjot Kaur Phokela, New Delhi (IN); Kuntal Dey, Birbhum (IN); Kapil Singi, Bangalore (IN); Vikrant Kaulgud, Pune (IN); Padmanaban Sukhumaran, Chicago, IL (US); Gopal Sarma Pingali, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 1035 days.

(21) Appl. No.: 17/951,745

(22) Filed: Sep. 23, 2022

(65) Prior Publication Data

US 2024/0104270 A1 Mar. 28, 2024

(51) Int. Cl.
*G06N 3/098* (2023.01)

(52) U.S. Cl.
CPC .................................... *G06N 3/098* (2023.01)

(58) Field of Classification Search
CPC ...................................................... G06N 3/098
See application file for complete search history.

(56) References Cited

U.S. PATENT DOCUMENTS 9,621,547 B2 * 4/2017 Sharaga .............. H04L 63/0869
10,193,858 B2 * 1/2019 Walker .................... G06F 21/00
2012/0113835 A1 * 5/2012 Alon ....................... H04L 45/58 370/252
2016/0095141 A1 * 3/2016 Ma ........................ H04W 76/10 455/416
2016/0182499 A1 * 6/2016 Sharaga .................. G06F 21/82 713/156
2016/0247129 A1 * 8/2016 Song ...................... G06Q 10/20
2021/0314417 A1 * 10/2021 Chen ....................... H04L 67/59
2021/0319281 A1 * 10/2021 Ji ........................... H04L 67/10
2022/0035341 A1 * 2/2022 Cella .................. G06Q 30/0206
2022/0191648 A1 * 6/2022 Smith ................ G06F 11/3089

OTHER PUBLICATIONS

Luan et al.; The Paradigm of Digital Twin Communications; 2021; arXiv; pp. 1-6.*

(Continued)

*Primary Examiner* — Phenuel S Salomon
(74) *Attorney, Agent, or Firm* — Mannava & Kang, P.C.

(57) ABSTRACT

A first device may provide, via a global digital twin of the first device, a communication mode assignment, of a communication mode, to a local digital twin of a second device. The communication mode assignment is to cause the local digital twin to communicate with the global digital twin via the communication mode. The first device may generate, via the global digital twin, a task assignment, and may provide, via the global digital, the task assignment to the local digital twin. The first device may update, via the global digital twin, a model based on the task assignment, and may receive, via the global digital twin and from the local digital twin, a model update associated with the local digital twin. The first device may update, via the global digital twin, the model based on the model update.

20 Claims, 11 Drawing Sheets

(56) References Cited

OTHER PUBLICATIONS

Jones et al., "Characterising the Digital Twin: A systematic literature review," CIRP Journal of Manufacturing Science and Technology, vol. 29, 2020, pp. 36-52.
Priyanka et al., "Digital twin for oil pipeline risk estimation using prognostic and machine learning techniques," Journal of Industrial Information Integration, vol. 26, Mar. 2022, 9 Pages.
Rasheed et al., "Digital Twin: Values, Challenges and Enablers From a Modeling Perspective," IEEE Access, Digital Object Identifier, Published Jan. 28, 2020, 33 Pages.

* cited by examiner

300

SUSTAINABLE AND SELF-ADAPTIVE FEDERATED DIGITAL TWIN FRAMEWORK

BACKGROUND

A digital twin is a virtual representation that serves as a real-time digital counterpart of a physical object or process. A digital twin may represent a physical asset, such as an infrastructure, and a conceptual asset, such as a process and a service, in a digital world through timely collection of data and simulators for real-time monitoring, prediction, inference, optimization, and improved policy optimizations.

SUMMARY

Some implementations described herein relate to a method. The method may include providing, by a global digital twin, a communication mode assignment, of a communication mode, to a local digital twin, where the communication mode assignment is to cause the local digital twin to communicate with the global digital twin via the communication mode. The method may include generating, by the global digital twin, a task assignment, and providing, by the global digital twin, the task assignment to the local digital twin. The method may include updating, by the global digital twin, a model based on the task assignment, and receiving, by the global digital twin and from the local digital twin, a model update associated with the local digital twin. The method may include updating, by the global digital twin, the model based on the model update.

Some implementations described herein relate to a first device. The first device may include one or more memories and one or more processors coupled to the one or more memories. The one or more processors may be configured to provide, by a global digital twin, a communication mode assignment, of a communication mode, to a local digital twin of a second device, where the communication mode assignment is to cause the local digital twin to communicate with the global digital twin via the communication mode. The one or more processors may be configured to generate a task assignment based on constraints and a knowledge base, and provide the task assignment to the local digital twin. The one or more processors may be configured to update a model based on the task assignment, and receive, from the local digital twin, a model update associated with the local digital twin. The one or more processors may be configured to update the model based on the model update, and receive a metadata update associated with metadata generated by the local digital twin. The one or more processors may be configured to update a global metadata repository based on the metadata update.

Some implementations described herein relate to a non-transitory computer-readable medium that stores a set of instructions for a first device. The set of instructions, when executed by one or more processors of the first device, may cause the first device to provide, by a global digital twin of the first device, a communication mode assignment, of a communication mode, to a local digital twin of a second device, and generate a task assignment based on constraints and a knowledge base. The set of instructions, when executed by one or more processors of the first device, may cause the first device to provide the task assignment to the local digital twin, and update a model based on the task assignment. The set of instructions, when executed by one or more processors of the first device, may cause the first device to receive, from the local digital twin, a model update associated with the local digital twin, and update the model based on the model update. The set of instructions, when executed by one or more processors of the first device, may cause the first device to receive a metadata update associated with metadata generated by the local digital twin, and update a global metadata repository based on the metadata update. The set of instructions, when executed by one or more processors of the first device, may cause the first device to receive a state update associated with a state of the local digital twin, and update a local twin repository based on the state update.

DETAILED DESCRIPTION

Figure 1A:
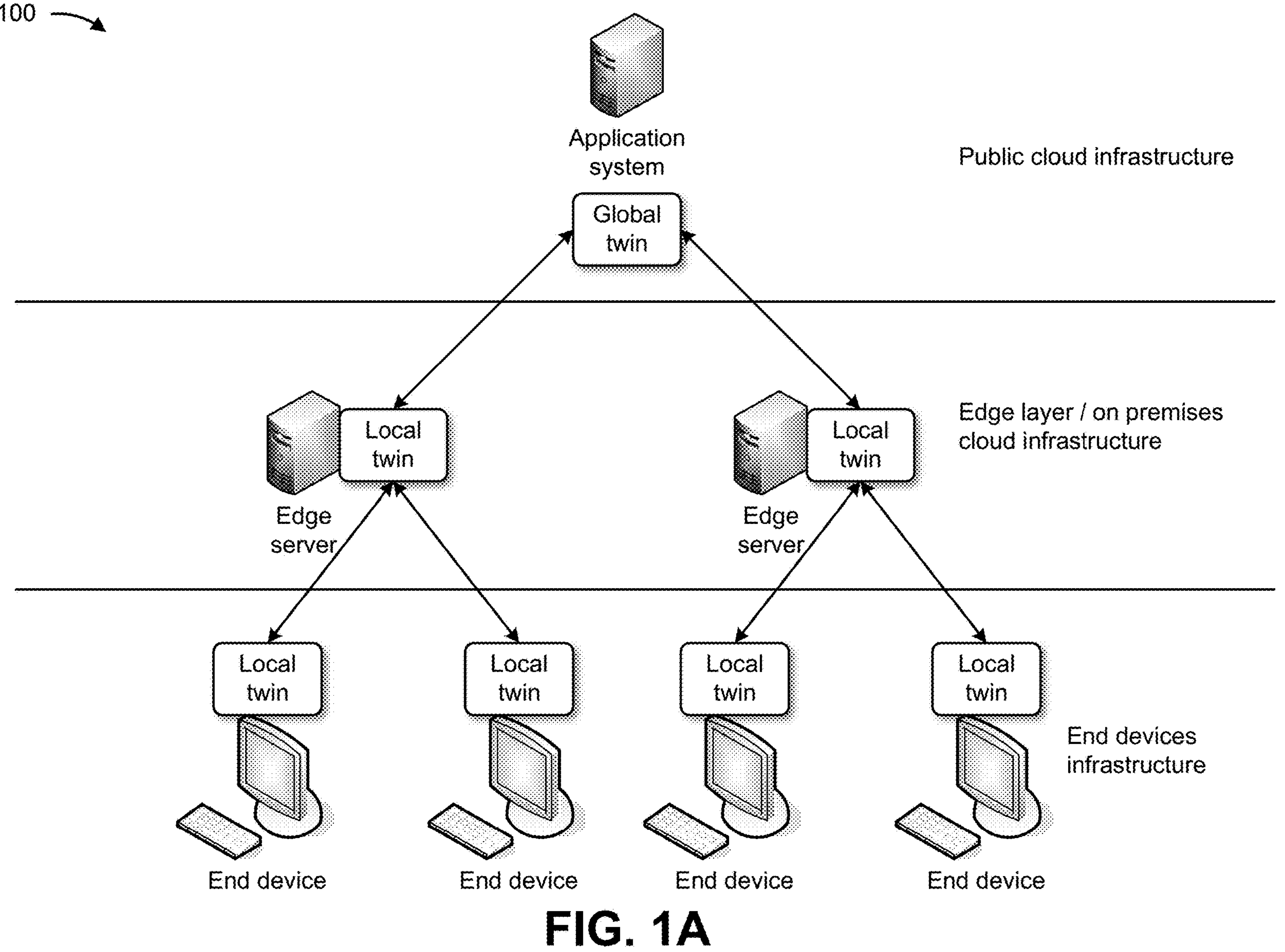
FIGS. 1A-1H are diagrams of an example implementation described herein.

The following detailed description of example implementations refers to the accompanying drawings. The same reference numbers in different drawings may identify the same or similar elements.

In a digital twin framework, nodes represent physical or logical entities or instances, such as a business entity, an asset, a piece of equipment, and/or the like. Edges are lines that connect the nodes, define a relationship between the nodes, and represent a communication link between the nodes. The edges may be directional to indicate a parent-child relationship amongst nodes. Properties are information (e.g., name and value pairs) associated with either the nodes or the edges. A digital twin may empower a cloud-based application for better management of application resources and energy-efficient evolution of the application. However, with the growing usability of digital twins, current techniques fail to make data intensive digital twins more sustainable, without compromising performance of the digital twins. Therefore, current techniques for providing a digital twin framework consume computing resources (e.g., processing resources, memory resources, communication resources, and/or the like), networking resources, and/or the like associated with failing to handle large volumes of data with the digital twin, incorrectly managing the large volumes of data with the digital twin, losing data due to failing to handle large volumes of data with the digital twin, handling failures of the digital twin due to data overload, and/or the like.

Some implementations described herein relate to an application system that provides a sustainable and self-adaptive federated digital twin framework. For example, the application system may provide, via a global digital twin (also referred to as a "global twin") of the application system, a communication mode assignment, of a communication mode, to a local digital twin (also referred to as "local twin") of a device. The communication mode assignment is to cause the local digital twin to communicate with the global digital twin via the communication mode. The application system may generate, via the global digital twin, a task assignment based on constraints and a knowledge base, and may provide, via the global digital twin, the task assignment to the local digital twin. The application system may update, via the global digital twin, a model based on the task assignment, and may receive, via the global digital twin and from the local digital twin, a model update associated with the local digital twin. The application system may update, via the global digital twin, the model based on the model update.

In this way, the application system provides a sustainable and self-adaptive federated digital twin framework. For example, the application system may be associated with a global digital twin and one or more local digital twins. The global twin and the local twins may form a digital twin framework. The global twin may provide a complete view of an application and an infrastructure ecosystem and may coordinate with the local twins for knowledge generation and sharing. A local twin may manage data of the local twin, and may interact with other local twins and the global twin for efficient management of the local twin. The application system may provide a self-adaptive and sustainable digital twin framework for a cloud-based (e.g., a cloud continuum) application. The digital twin framework may perform sustainable management of data communications, data processing, knowledge generation, knowledge sharing, and/or the like, and may provide self-adaptive data quality management that ensures the quality of the digital twin framework. The application system may enable collaboration among the local twins and the global twin to create a federated twin, and may perform knowledge management to ensure seamless and efficient flow of data and control among the global twin and the local twins. The application system may provide adaptive methodology recommendations to fine tune data quality for the global twin and the local twins, and may manage knowledge generation based on transfer learning. The application system may ensure the data quality in a self-adaptive manner based on a Q-learning framework. This, in turn, conserves computing resources, networking resources, and/or the like that would otherwise have been consumed in failing to handle large volumes of data with the digital twin, incorrectly managing the large volumes of data with the digital twin, losing data due to failing to handle large volumes of data with the digital twin, handling failures of the digital twin due to data overload, and/or the like.

FIGS. 1A-1H are diagrams of an example 100 associated with providing a sustainable and self-adaptive federated digital twin framework. As shown in FIGS. 1A-1H, example 100 includes an application system associated with a global twin, edge servers associated with local twins, and end devices associated with local twins. The application system may include a system that provides a sustainable and self-adaptive federated digital twin framework. Further details of the application system, the global twin, the edge servers, the end devices, and the local twins are provided elsewhere herein.

FIG. 1A provides an overview of an example digital twin architecture. As shown in FIG. 1A, the application system may be provided in a public cloud infrastructure and may include the global twin. The application system may provide an application for the edge servers and/or the end devices. The edge servers may be provided in an edge layer, such as an on premises cloud infrastructure. Each of the edge servers may include a local twin. The end devices may be provided in an end devices infrastructure (e.g., sensors within a factory, video surveillance cameras within a building, and/or the like). Each of the end devices may include a local twin. As further shown in FIG. 1A, the local twins of the edge servers may communicate with the global twin, and each of the local twins of the edge servers may communicate with one or more local twins of the end devices.

The global twin may interact with the local twins for generating a complete view of the application and an infrastructure ecosystem. The local twins may collect and process data locally for sustainable processing and management of the data. In some implementations, the global twin may generate an overall knowledge generation task and may divide the task into multiple subtasks. Each of the local twins may be responsible for one of the subtasks, which may reduce data processing overhead and make the local twins more sustainable. In some implementations, the local twins may utilize a Q-learning framework to maintain data quality without any central intervention.

The global twin may generate a complete view of the application and may provide for timely collection of data (e.g., metadata) from the local twins. The global twin may manage a global knowledge base and may manage and dictate various policies of the global twin and the local twins. The local twin may self-adaptively collect data and may communicate a summary of the collected data to the global twin. The local twin may communicate requested data to the global twin, may process the collected data for generating knowledge, and may providing intelligent services to other local twins. In this way, the global twin and the local twins may provide a distributed architecture that is easily scalable; does not overload the global twin in terms of data communication and data processing; sustains during communication faults; implements device-specific security, privacy, and other policies, and/or the like.

In one example of the digital twin architecture, an aquaculture application of the application system may collect data from water bodies by using end devices (e.g., Internet of Things (IoT) devices with pH sensors and temperature sensors) and may provide multiple services to various types of users. The digital twin architecture may enable the application to efficiently perform various functions, such as ensure that the local twins associated with the IoT devices communicate measurements to the global twin, process the measurements with a model provided by the global twin, and/or the like.

Figure 1B:
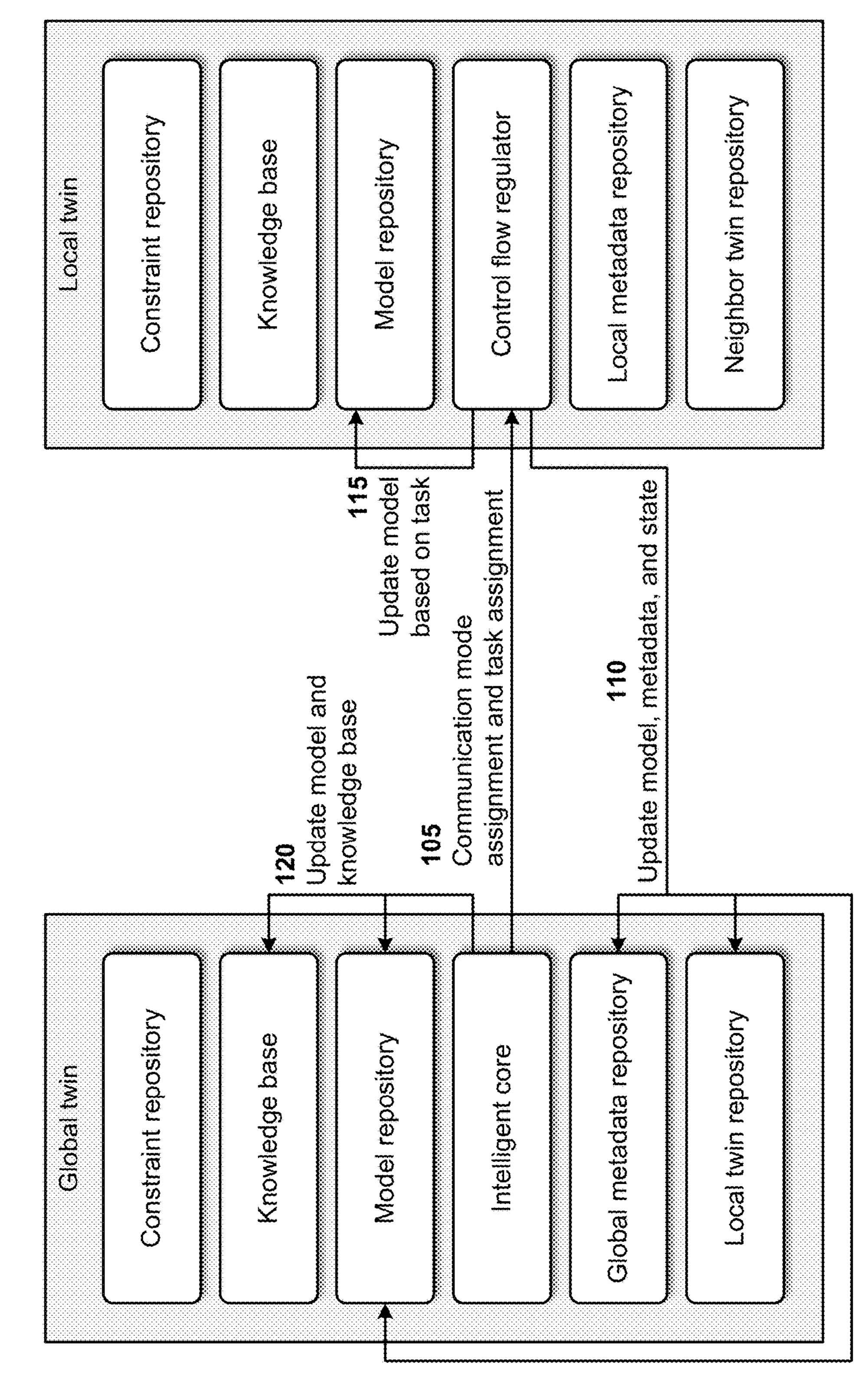

FIG. 1B provides an overview of example components of the global twin and the local twin. As shown in FIG. 1B, the global twin may include a constraint repository, a knowledge base, a model repository, an intelligent core, a global metadata repository, and a local twin repository. The constraint repository may include data structure (e.g., a database, a table, a list, and/or the like) that stores constraints for local twin interactions, task assignment policies, data quality policies, and/or the like. The knowledge base may include a data structure that stores an ontology-based knowledge base that captures the interactions between the global twins and the local twins and provides a structured representation of the knowledge. The model repository may include a data structure that stores a global repository of knowledge and inference models (e.g., machine learning models). The intelligent core may be configured to manage communication and processing in an intelligent manner (e.g., with the local twins) to achieve sustainability and self-adaptiveness. The intelligent core may provide a connection between the local twins and the global twin for seamless communication and data flow, and may organize data management, processing, and task allocations with the local twins, based on past data records, type of tasks, processing requirements, and/or the like. The global metadata repository may include a data structure that stores communicated metadata received from the local twins. The local twin repository may include a data structure that stores current states of the local twins.

As further shown in FIG. 1B, the local twin may include a constraint repository, a knowledge base, a model repository, a control flow regulator, a local metadata repository, and neighbor twin repository. The constraint repository may include a data structure that stores constraints for local twin interactions, metadata collection policies, data quality policies, and/or the like. The knowledge base may include a data structure that stores an ontology-based knowledge base that captures the knowledge model of the local twin. The model repository may include a data structure that stores specialized knowledge and inference models learned by the local twin. The control flow regulator may be configured to regulate a communication mode and a learning mechanism for data processing in the local twin. The local metadata repository may include a data structure that stores collected metadata of the local twin. The neighbor twin repository may include a data structure that stores selective information from other local twins.

As further shown in FIG. 1B, and by reference number 105, the intelligent core of the global twin may provide a communication mode assignment, of a communication mode, and a task assignment to the control flow regulator of the local twin. For example, the intelligent core of the global twin may generate the communication mode assignment based upon information provided in the constraint repository, and may provide the communication mode assignment to the control flow regulator of the local twin. The communication mode assignment may cause the local digital twin to communicate with the global digital twin via the communication mode. The intelligent core of the global twin may generate the task assignment based on information provided in the constraint repository and the knowledge base, and may provide the task assignment to the control flow regulator of the local twin.

As further shown in FIG. 1B, and by reference number 110, the control flow regulator of the local twin may update a model, metadata generated by the local twin, and/or a state of the local twin in the model repository, the global metadata repository, and/or the local twin repository, respectively, of the global twin. For example, the control flow regulator of the local twin may update a learned model of a task in the model repository of the global twin. The control flow regulator of the local twin may update the metadata in the global metadata repository of the global twin. The control flow regulator of the local twin may update the state in the local twin repository of the global twin.

As further shown in FIG. 1B, and by reference number 115, the control flow regulator of the local twin may update the model, in the model repository of the local twin, based on the task. For example, the control flow regulator of the local twin may learn the assigned task and may update the model, in the model repository, based on learning the assigned task.

As further shown in FIG. 1B, and by reference number 120, the intelligent core of the global twin may update the model in the model repository of the global twin and may update the knowledge base. For example, the intelligent core of the global twin may update the model in the model repository based on the update to the model, the metadata, and/or the state, and may update the knowledge base based on the update to the model, the metadata, and/or the state.

Figure 1C:
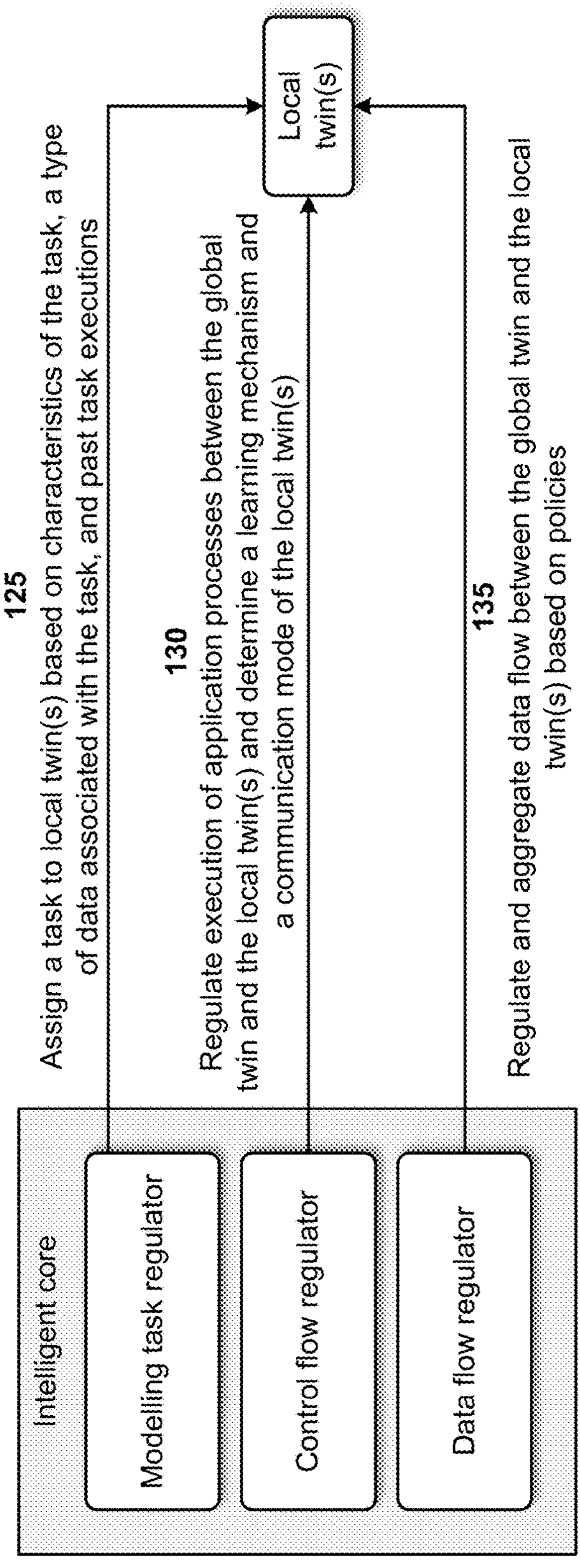

FIG. 1C provides an overview of example components of the intelligent core of the global twin. As shown in FIG. 1C, the intelligent core may include a modelling task regulator, a control flow regulator, and data flow regulator. The intelligent core may provide seamless communication, data flow, and control flow between various local twins and the global twin, and may recommend and implement adaptive techniques to regulate and fine tune data quality. As further shown in FIG. 1C, and by reference number 125, the modelling task regulator may assign a task to local twin(s) based on characteristics of the task, a type of data associated with the task, and past task executions of the local twins. For example, the modelling task regulator may be configured to allocate and assigning tasks to specific local twins based on characteristics of the task, type of data, past execution records of the local twins, and/or the like.

As further shown in FIG. 1C, and by reference number 130, the control flow regulator may regulate execution of application processes between the global twin and the local twin(s) and may determine a learning mechanism and a communication mode of the local twin(s). For example, the control flow regulator may be configured to regulate an order in which processes or function calls of an imperative program are executed between a local twin or local twins and the global twin for optimized data processing, communication, management, and/or the like. The control flow regulator may be configured to determine a learning mechanism and a communication mode of a local twin.

As further shown in FIG. 1C, and by reference number 135, the data flow regulator may regulate and aggregate data flow between the global twin and the local twin(s) based on policies. For example, the data flow regulator may be configured to regulate and aggregate data flow between the global twin and the local twins based on policies and techniques associated with a use case, data characteristics as recommended by a policy, and/or the like.

In some implementations, the intelligent core may be configured to provide data and control flow with the local twins, without compromising performance of the application system. For example, if a user wants to know a health status of IoT devices, the intelligent core may be configured to continuously monitor data and cause analytics to be performed on the local twin of the edge server.

In one example, the intelligent core may determine, based on user requirements, a task that includes assigning a health evaluation of IoT devices to an edge server, regulating a control flow (e.g., consolidating data), and updating sensor data received from the IoT devices. Based on the task, the modelling task regulator may determine a status (e.g., location, network connectivity, computational load, and/or the like) of the edge server, and may assign the task to the edge server based on an execution flow and a communication mode associated with the edge server. The control flow regulator may determine the communication mode based on policies, the status of the edge server, and/or the like. The data flow regulator may control how often to allow processing and flow of data between the global twin and the local twin based on a criticality of an application, a type of data (e.g., sensitive or non-sensitive), policies governing data, and/or the like. If the application is not a critical application and the data is non-sensitive, the data flow regulator may aggregate or batch process data among the local twins.

Figure 1D:
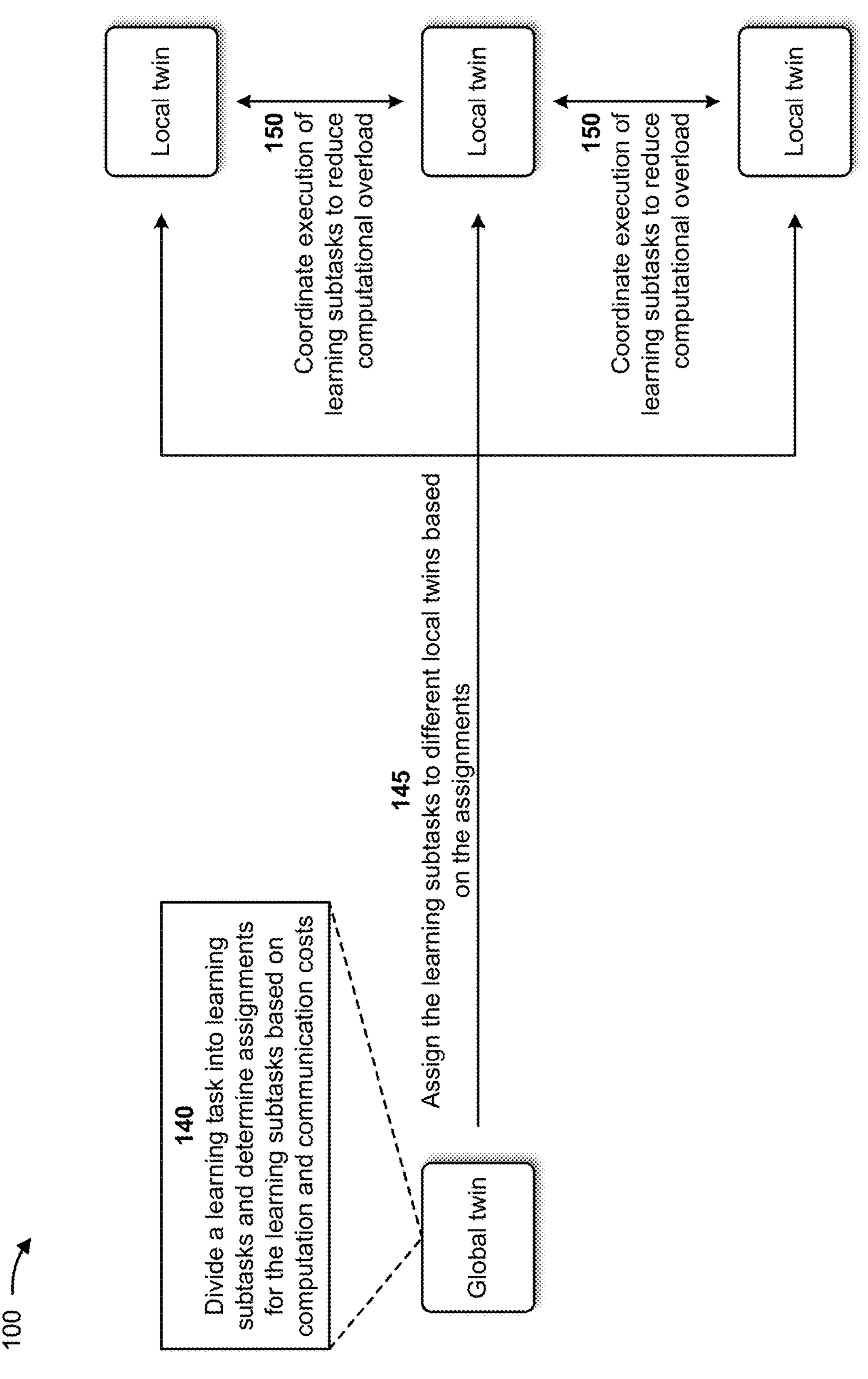

FIG. 1D depicts an example of sustainable data management provided by the global twin and the local twins. As shown in FIG. 1D, and by reference number 140, the global twin may divide a learning task into learning subtasks and may determine assignments for the learning subtasks based on computation and communication costs. For example, the global twin may divide tasks into subtasks to reduce computation and communication overhead, and may cause data to be processed near an origination of the data to reduce communication overhead. The local twins may communicate with global twin in an aggregate mode (e.g., where the local twins communicate aggregated data to reduce communication overhead) or a raw data mode (e.g., where the local twins communicate raw data for processing by the global twin). In some implementations, the global twin may partition an overall computation for learning and inferencing tasks into subtasks.

In some implementations, when determining the assignments for the learning subtasks, the global twin may utilize an assignment model:

$$\text{minimize } \Sigma_{i\in DT}\Sigma_{j\in T}I(i,j)(\text{Comp}(i,j)+\text{Comm}(i,j)),$$

$$\forall j,\Sigma_{i\in DT}I(i,j)=1, \text{ and}$$

$$\forall i,\Sigma_{j\in T}I(i,j)\text{Comp}(i,j)\leq B_i,$$

where DT is a set of local twins and the global twin, T is a set of all learning and inference subtasks, I(i,j) is an indicator function, I(i,j)=1 if task j is assigned to twin i and zero otherwise, Comp(i,j) is a computation cost of learning the task j by twin i, and Comm(i,j) is a communication cost of learning the task j by twin i. The first constraint may ensure that a subtask is assigned to only one twin, and the second constraint may ensure that an overall computation overhead of learning and inference does not exceed a budget of a local twin or a global twin. The communication cost may be measured from a quantity of hops required for a packet to reach from source to destination. The learning subtasks may be categorized as low cost, medium cost, or high cost subtasks. For example, learning a mean and a variance of values of an attribute is a low cost task, and learning a neural network-based classifier is a high cost task.

As further shown in FIG. 1D, and by reference number 145, the global twin may assign the learning subtasks to different local twins based on the assignments. For example, the global twin may assign the learning subtasks to different local twins based on the assignments calculated by the global twin. The local twins may receive the learning subtasks and may execute the learning subtasks to generate results. The local twins may provide the results to the global twin.

As further shown in FIG. 1D, and by reference number 150, the local twins may coordinate execution of learning subtasks to reduce computational overload. For example, the local twins coordinate among themselves to reduce the computational overload on the local twins. Each local twin may execute one learning task and may provide a result of executing the learning task as a service to other local twins. In some implementations, the local twins may utilize transfer learning to share knowledge, which may reduce the computational overhead because of collaboration among the local twins.

In one example, the global twin may generate a first subtask (T1) associated with learning a distribution of temperature data measured by IoT devices with temperature sensors, a second subtask (T2) associated with learning a link quality estimate between edge servers and the application system (e.g., where the application system is a subpart of an entire application), and a third subtask (T3) associated with learning an efficiency of a task offloading policy of the edge servers to the application system. According to a global policy, the first subtask T1 is classified as a low cost task and the second and third subtasks T2 and T3 are classified as high cost tasks. The global twin may calculate a computation budget of each edge server local twin as one subtask, a computation budget of the global twin as one hundred subtasks, a communication cost for the global twin as subtask T1: 2, subtask T2: 2, and subtask 3: 1, and a communication cost for an edge server local twin as subtask T1: 1, subtask T2: 1, and subtask 3: 0. In such an example, the global twin may assign the first subtask T1 to a first local twin, the second subtask T2 to a second local twin, and the third subtask T3 to the global twin to minimize the communication cost and satisfy the computation constraints.

Figure 1E:
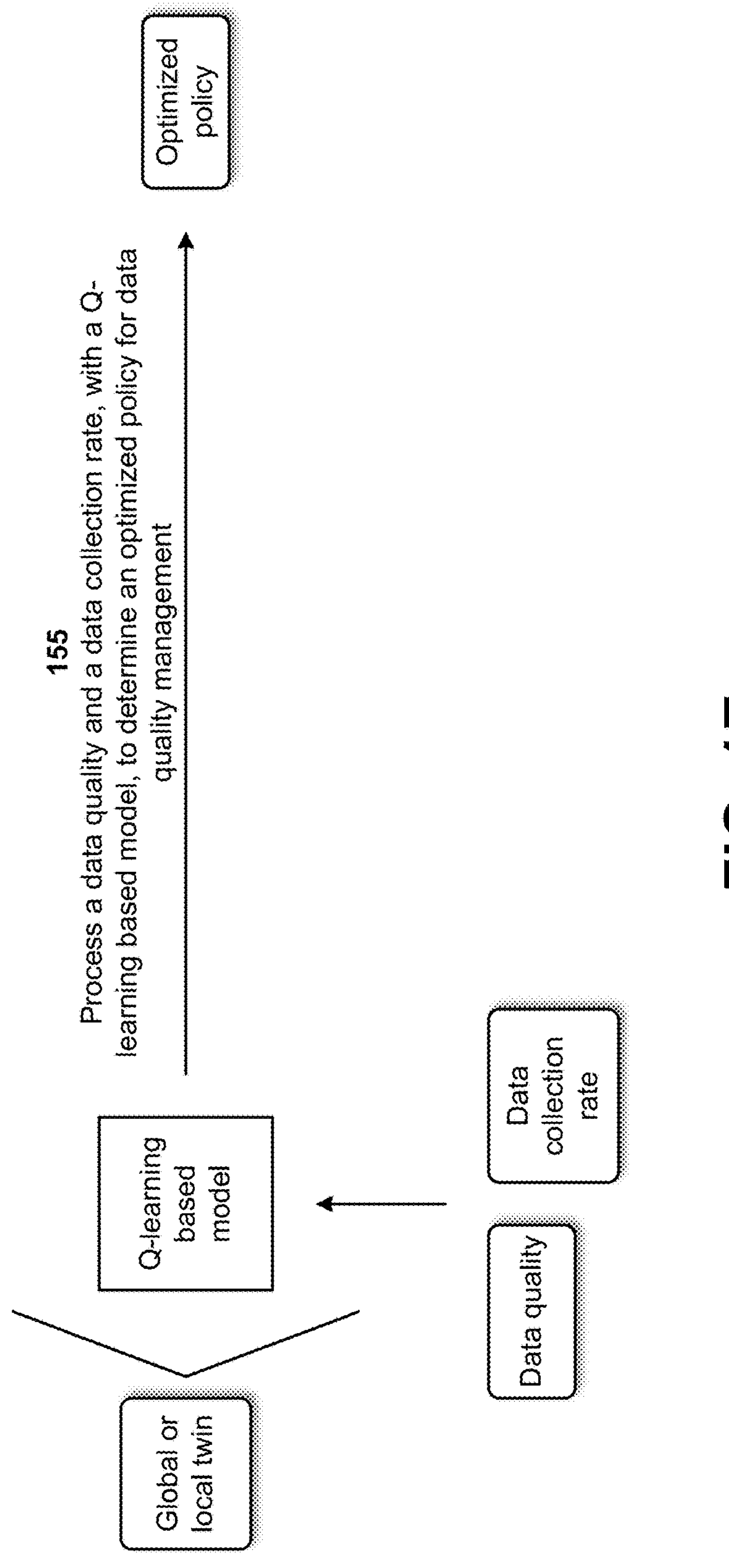

FIG. 1E depicts an example of self-adaptive data quality management with a Q-learning framework. As shown in FIG. 1E, and by reference number 155, the global twin and/or the local twins may process a data quality and a data collection rate, with a Q-learning based model, to determine an optimized policy for data quality management. For example, a Q-learning based model is a reinforcement learning model that learns a value of an action in a particular state. The global twin and/or the local twin may independently manage a quality of collected data. The quality of data may be estimated from a volume of data and a variety of data, and a data collection rate may directly control the volume of data. The variety of the data may depend on a whether the variety is defined by a policy (e.g., a variance of collected data is one measure of the variety). The global twin and/or the local twin may alter data collection rates (e.g., the volume and/or the variety) to optimize the data quality. The global twin and/or the local twin may maintain the data quality based on a data quality policy, a priority assessment policy, and/or the like. The priority assessment policy may define a priority of different contexts and events (e.g., different sensors may have different priorities) and may categorize the priorities into three classes (e.g., low, medium, and high). The global twin and/or the local twin may utilize the Q-learning based model to determine the optimized policy for data quality management based on the data quality and the data collection rate.

In some implementations, the Q-learning based model may utilize tuples (e.g., states, actions, and rewards). The states may be estimated based on the data quality (e.g., categorized into three levels: low, medium, and high) and the data collection rate (e.g., which is context specific and categorized as low, medium, and high). Data collection rate levels may be contextual and policy-defined (e.g., the data collection rates from two different sensors may be categorized differently). The data quality and the data collection rate may be priority specific. The actions may include, for example, increasing the data collection rate, decreasing the data collection rate, maintaining the data collection rate, and/or the like. The actions may be defined by a policy and different priorities may be associated with different data rate changes. The rewards may include, for example, a positive one (+1) when the data quality improves, a zero (0) when the data quality does not change, a negative one (−1) when the data quality degrades, and/or the like.

In one example, a task for the Q-learning based model may include providing data quality management for link quality estimation between the edge servers and the application system. The task may be assigned a high priority according to a priority-assessment policy since communication links between the edge servers and the application system are very important for application functionality. The data quality may be categorized into three levels: high, medium, and low, and may be measured based on a standard error associated with estimation of parameters of a data distribution of link quality estimators (e.g., standard error (SE)=(standard deviation)/(quantity of samples)$^{0.5}$), where a high data quality may occur when SE≤0.5, a medium data quality may occur when 0.5<SE≤1, and a low data quality may occur when SE>1. A maximum data sampling rate (SR) may be ten (10) samples per second, a high data sampling rate may occur when the SR is greater eight (8) samples per second, a medium data sampling rate may occur when the SR is greater than or equal to six (6) samples per second and less than or equal to eight (8) samples second, and a low data sampling rate may occur when the SR is less than six (6) samples per second.

In such an example, the Q-learning based model may attempt to maximize the data quality while minimizing the data sampling rate (e.g., to learn an optimized data sampling rate) in order to minimize processing and communication overhead. The Q-learning based model may consider nine states in the example (e.g., <high, high>, <high, medium>, . . . , <low, medium>, <low, low>), may determine an action (e.g., increase the data sampling rate by one sample per second, decrease the data sampling rate by one sample per second, and/or the like), and may determine a reward based on the action (e.g., a positive one (+1) when the data quality improves, a zero (0) when the data quality does not change, a negative one (−1) when the data quality degrades, and/or the like). A state may be parameterized by data quality and a sampling rate, and each of these two parameters may include three values {low, medium, high} (e.g., so a total of nine states). The Q-learning based model may partition the overall learning into multiple episodes based one of the nine states and may attempt to improve the data quality or at least not change the data quality.

In this example, the global twin may partition overall task management into four phases: assigning the task to a single twin (e.g., local twin or another global twin) to reduce processing and communication overhead, learning the task with the Q-learning based model, sharing a learned model for data quality management with other twins, and causing the other twins to utilize transfer learning to calibrate and personalize the learned model. For example, the global twin may assign the learning task to a local twin collocated with an edge server. The local twin may learn the task and utilize the Q-learning based model for data quality management. The local twin may share the learned model with the global twin and another local twin. The global twin may store the learned model in the model repository, and the other local twin may customize the learned model for data of the other local twin. The other local twin may also utilize transfer learning to reduce processing and data management costs.

Figure 1F:
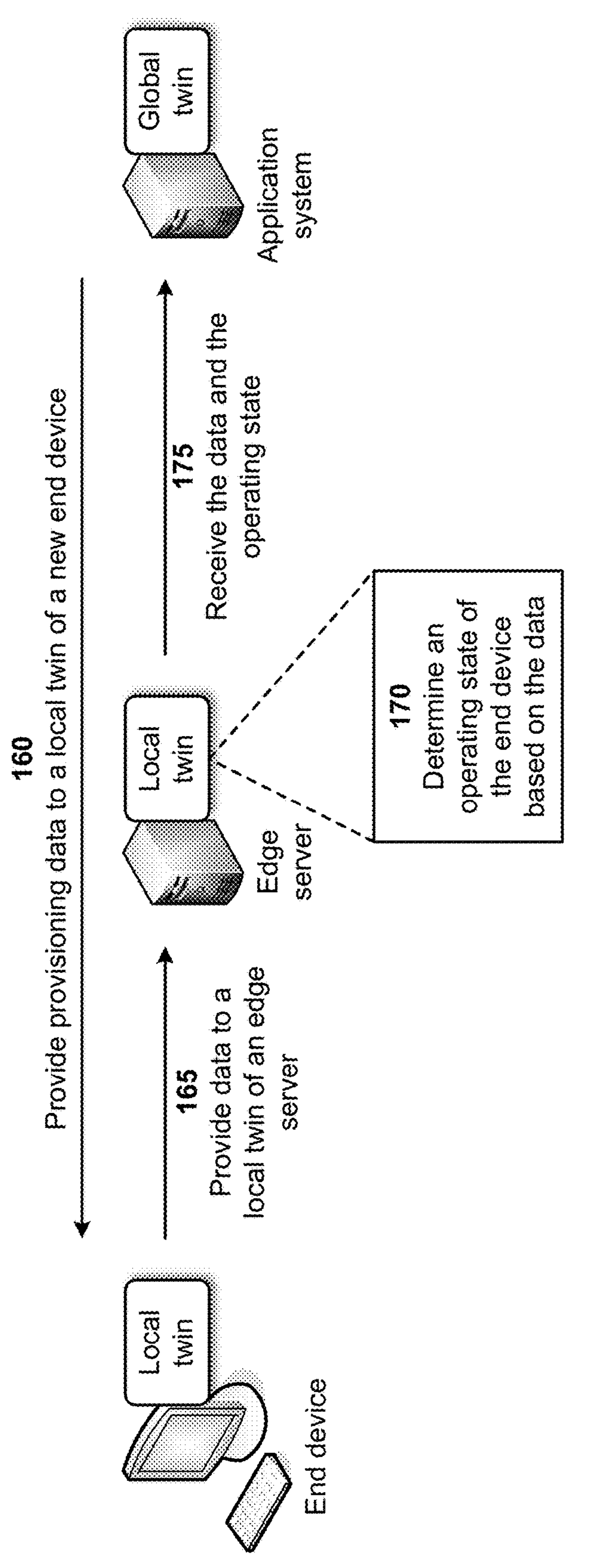

FIG. 1F depicts an example of provisioning a local twin of a new end device. As shown in FIG. 1F, and by reference number 160, the global twin of the application system may provide provisioning data to a local twin of a new end device. For example, the new end device may generate telemetry data, may be hardwired or wirelessly connected to an edge server, and may include a local twin. The edge server may include local storage, modules that host workloads, and a local twin. The application system may provide services for end device provisioning, configuration, and management, and may include a repository of workload containers. When the new end device is powered on, the local twin of the new end device may register with a device provisioning service provided by the global twin of the application system. The global twin may receive the registration from the local twin of the new end device and may approve the registration. Upon approving the registration, the global twin may provide the provisioning data to the local twin of the new end device. The provisioning data may include data identifying an identity of the local twin of the new end device and connection instructions for the local twin of the new end device.

As further shown in FIG. 1F, and by reference number 165, the local twin of the new end device may provide data to the local twin of the edge server. For example, once connected, the local twin of the new end device may transmit data (e.g., telemetry data) to the local twin of the edge server. In some implementations, the local twin of the new end device may optionally store the data locally within the local twin of the new end device.

As further shown in FIG. 1F, and by reference number 170, the local twin of the edge server may determine an operating state of the local twin of the new end device based on the data. For example, the local twin of the edge server may determine the operating state of the local twin of the new end device and may apply a configuration based on the operating state. In some implementations, the local twin of the edge server may download and configure edge modules (e.g., container images) based on the configuration.

As further shown in FIG. 1F, and by reference number 175, the global twin of the application system may receive the data and the operating state from the local twin of the edge server. For example, the local twin of the edge server may establish a heartbeat signal to determine an online/offline status of the local twin of the new end device and may report the data, the operating state, and the configuration to the global twin. The global twin may receive the data, the operating state of the local twin of the new end device, and the configuration from the local twin of the edge server.

In one example, when the new end device includes sensors, the sensors may collect telemetry data, and the local twin of the new end device may provide the telemetry data to a queue of the local twin of the edge server. The local twin of the edge server may inspect the telemetry data to determine a source and a format of the telemetry data, and may retrieve configuration values to assign remaining actions to perform for the telemetry data. The local twin of the edge server may convert the telemetry data into a canonical format so that data operations may be standardized and may add an asset hierarchy to the telemetry data to make the telemetry data more consumable. In some implementations, the local twin of the edge server may convert data values of the telemetry data into standard unit types so that data operations may be more reliable. The local twin of the edge server may process the telemetry data and/or may provide the telemetry data to the global twin of the application system.

Figure 1G:
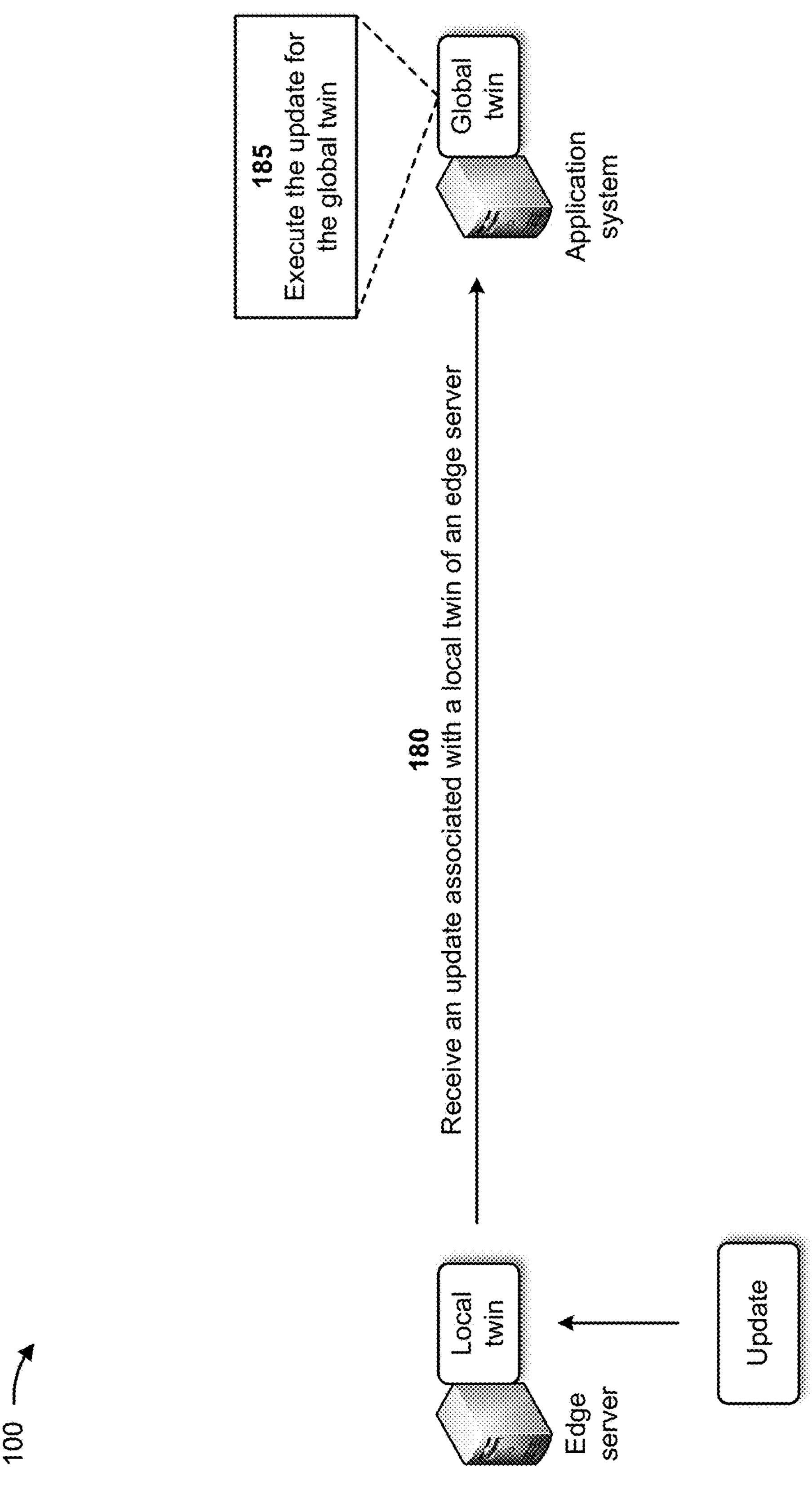

FIG. 1G depicts an example of synchronizing an update to a local twin of an edge server with the global twin. As shown in FIG. 1G, and by reference number 180, the global twin of the application system may receive an update associated with a local twin of an edge server. For example, a user of the edge server and/or the local twin of the edge server may initiate the update associated with the local twin, and local twin may generate a message indicating that the update is to be synchronized with the global twin. An edge sync agent of the local twin may receive the message and may forward the message to a cloud inbound change feed of the local twin. The cloud inbound change feed of the local twin may provide the message (e.g., with the update) to the global twin based on the message. The global twin may receive the message and the update from the local twin of the edge server.

As further shown in FIG. 1G, and by reference number 185, the global twin of the application system may execute the update for the global twin. For example, a cloud sync agent may retrieve the message and may execute a corresponding update for the global twin. In this way, the global twin may synchronize with the update associated with the local twin of the edge server.

Figure 1H:
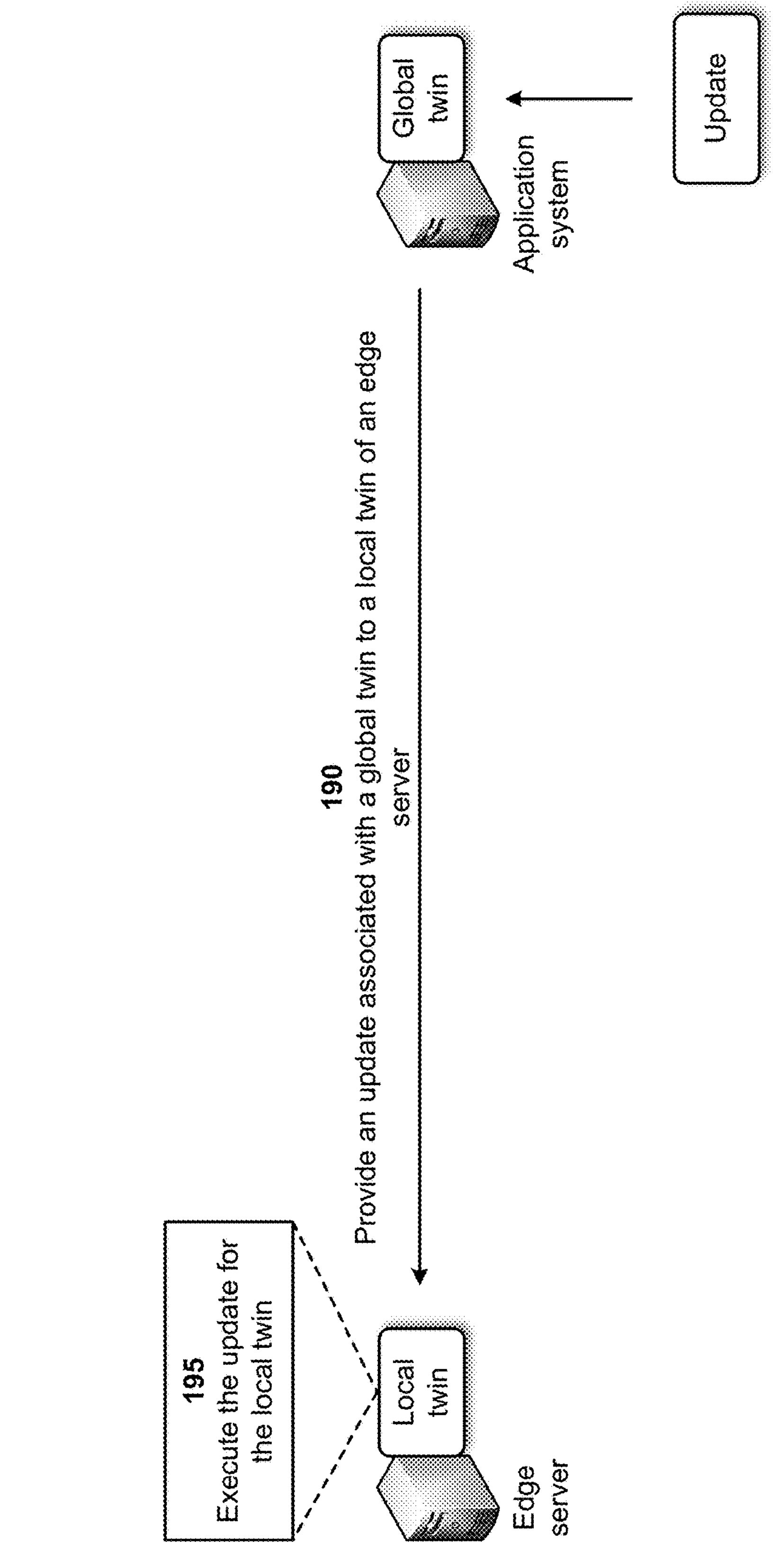

FIG. 1H depicts an example of synchronizing an update of a global twin with a local twin of an edge server. As shown in FIG. 1H, and by reference number 190, the global twin of the application system may provide an update associated with the global twin to the local twin of the edge server. For example, a user of the application system and/or the global twin of the application system may initiate the update associated with the global twin. The global twin may execute the update for the global twin and may generate a message indicating that the update is to be synchronized with the local twin. A cloud sync agent of the global twin may receive the message and may forward the message (e.g., with the update) to edge inbound change feed of global twin. The edge inbound change feed may provide the update to the local twin of the edge server.

As further shown in FIG. 1H, and by reference number 195, the local twin of the edge server may execute the update for the local twin. For example, an edge sync agent of the local twin may retrieve the message and may execute a corresponding update for the local twin. In this way, the local twin of the edge server may synchronize with the update associated with the global twin.

In this way, the application system provides a sustainable and self-adaptive federated digital twin framework. For example, the application system may be associated with a global twin and one or more local twins. The global twin and the local twins may form a digital twin framework. The application system may provide a self-adaptive and sustainable digital twin framework for a cloud-based application. The digital twin framework may perform sustainable management of data communications, data processing, knowledge generation, knowledge sharing, and/or the like, and may provide self-adaptive data quality management that ensures the quality of the digital twin framework. The application system may enable collaboration among the local twins and the global twin to create a federated twin, and may perform knowledge management to ensure seamless and efficient flow of data and control among the global twin and the local twins. The application system may provide adaptive methodology recommendations to fine tune data quality for the global twin and the local twins, and may manage knowledge generation based on transfer learning. The application system may ensure the data quality in a self-adaptive manner based on a Q-learning framework. This, in turn, conserves computing resources, networking resources, and/or the like that would otherwise have been consumed in failing to handle large volumes of data with the digital twin, incorrectly managing the large volumes of data with the digital twin, losing data due to failing to handle large volumes of data with the digital twin, handling failures of the digital twin due to data overload, and/or the like.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
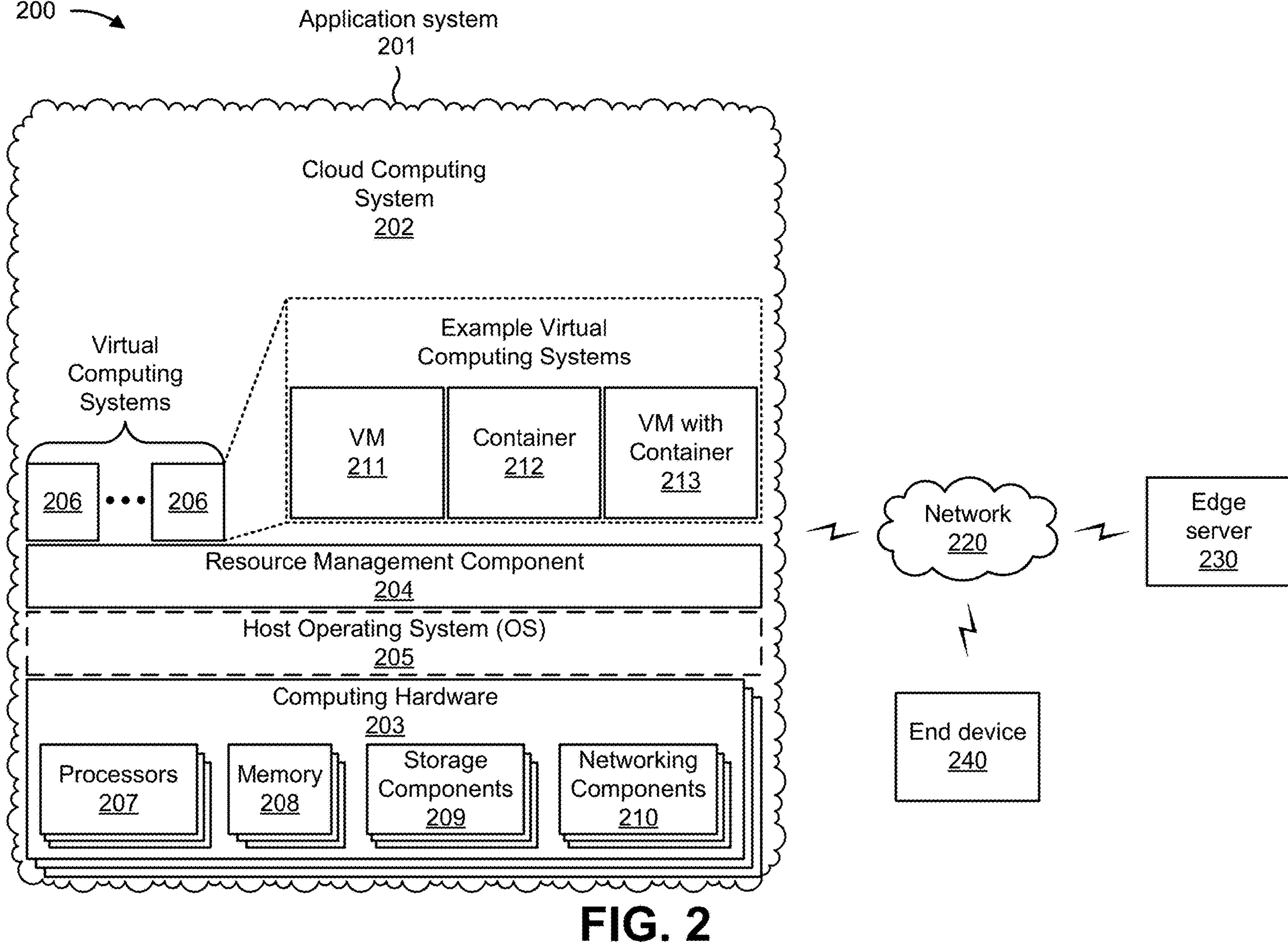
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include an application system 201, which may include one or more elements of and/or may execute within a cloud computing system 202. The cloud computing system 202 may include one or more elements 203-213, as described in more detail below. As further shown in FIG. 2, the environment 200 may include a network 220, an edge server 230, and/or an end device 240. Devices and/or elements of the environment 200 may interconnect via wired connections and/or wireless connections.

The cloud computing system 202 includes computing hardware 203, a resource management component 204, a host operating system (OS) 205, and/or one or more virtual computing systems 206. The resource management component 204 may perform virtualization (e.g., abstraction) of the computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing the computing hardware 203 to start, stop, and/or manage the one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although the application system 201 may include one or more elements 203-213 of the cloud computing system 202, may execute within the cloud computing system 202, and/or may be hosted within the cloud computing system 202, in some implementations, the application system 201 may not be cloud-based (e.g., may be implemented outside of a cloud computing system) or may be partially cloud-based. For example, the application system 201 may include one or more devices that are not part of the cloud computing system 202, such as device 300 of FIG. 3, which may include a standalone server or another type of computing device. The application system 201 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or the like, and/or a combination of these or other types of networks. The network 220 enables communication among the devices of the environment 200.

The edge server 230 may include one or more devices capable of receiving, generating, storing, processing, providing, and/or routing information, as described elsewhere herein. The edge server 230 may include a communication device and/or a computing device. For example, the edge server 230 may include a server, such as an application server, a client server, a web server, a database server, a host server, a proxy server, a virtual server (e.g., executing on computing hardware), or a server in a cloud computing system. In some implementations, the edge server 230 may include computing hardware used in a cloud computing environment.

The end device 240 may include one or more devices capable of receiving, generating, storing, processing, and/or providing information, as described elsewhere herein. The end device 240 may include a communication device and/or a computing device. For example, the end device 240 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), an IoT device, or a similar type of device.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
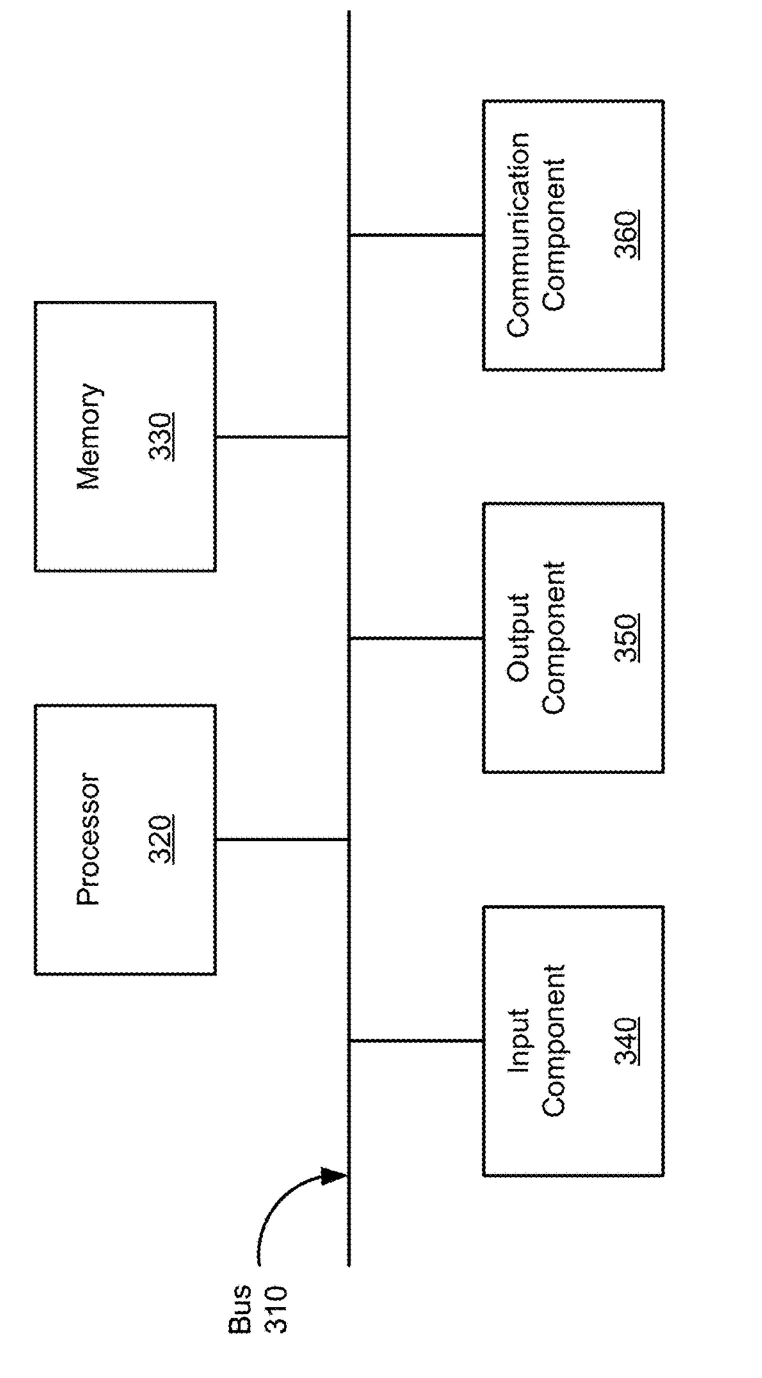
FIG. 3 is a diagram of example components of one or more devices of FIG. 2.

FIG. 3 is a diagram of example components of a device 300, which may correspond to the application system 201, the edge server 230, and/or the end device 240. In some implementations, the application system 201, the edge server 230, and/or the end device 240 may include one or more devices 300 and/or one or more components of the device 300. As shown in FIG. 3, the device 300 may include a bus 310, a processor 320, a memory 330, an input component 340, an output component 350, and a communication component 360.

The bus 310 includes a component that enables wired and/or wireless communication among the components of device 300. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform a function. The memory 330 includes a random-access memory, a read only memory, and/or another type of memory (e.g., a flash memory, a magnetic memory, and/or an optical memory).

The input component 340 enables the device 300 to receive input, such as user input and/or sensed inputs. For example, the input component 340 may include a touch screen, a keyboard, a keypad, a mouse, a button, a microphone, a switch, a sensor, a global positioning system component, an accelerometer, a gyroscope, an actuator, and/or the like. The output component 350 enables the device 300 to provide output, such as via a display, a speaker, and/or one or more light-emitting diodes. The communication component 360 enables the device 300 to communicate with other devices, such as via a wired connection and/or a wireless connection. For example, the communication component 360 may include a receiver, a transmitter, a transceiver, a modem, a network interface card, an antenna, and/or the like.

The device 300 may perform one or more processes described herein. For example, a non-transitory computer-readable medium (e.g., the memory 330) may store a set of instructions (e.g., one or more instructions, code, software code, program code, and/or the like) for execution by the processor 320. The processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
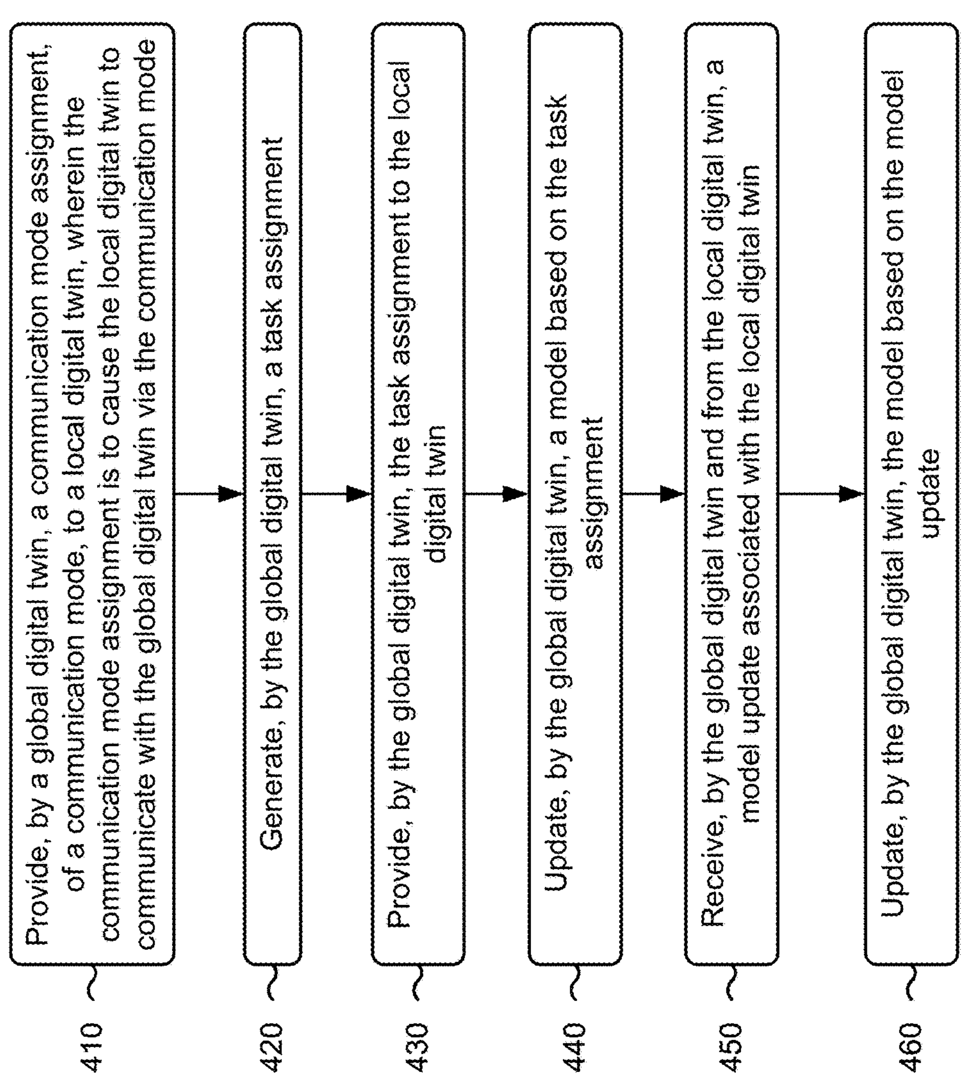
FIG. 4 is a flowchart of an example process for providing a sustainable and self-adaptive federated digital twin framework.

FIG. 4 is a flowchart of an example process 400 for providing a sustainable and self-adaptive federated digital twin framework. In some implementations, one or more process blocks of FIG. 4 may be performed by a first device (e.g., a global twin of the application system 201). In some implementations, one or more process blocks of FIG. 4 may be performed by another device or a group of devices separate from or including the first device, such as a second device (e.g., a local twin of the edge server 230 or a local twin of the end device 240). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include providing a communication mode assignment, of a communication mode, to a local digital twin of a second device (block 410). For example, the first device may provide a communication mode assignment, of a communication mode, to a local digital twin of a second device, as described above. In some implementations, the communication mode assignment is to cause the local digital twin to communicate with the global digital twin via the communication mode. In some implementations, the global digital twin is provided in a public cloud infrastructure and the local digital twin is provided in an edge server or an end device.

As further shown in FIG. 4, process 400 may include generating, by the global digital twin, a task assignment (block 420). For example, the first device may generate, by the global digital twin, a task assignment, as described above.

As further shown in FIG. 4, process 400 may include providing, by the global digital twin, the task assignment to the local digital twin (block 430). For example, the first device may provide, by the global digital twin, the task assignment to the local digital twin, as described above.

As further shown in FIG. 4, process 400 may include updating, by the global digital twin, a model based on the task assignment (block 440). For example, the first device may update, by the global digital twin, a model based on the task assignment, as described above.

As further shown in FIG. 4, process 400 may include receiving, by the global digital twin and from the local digital twin, a model update associated with the local digital twin (block 450). For example, the first device may receive, by the global digital twin and from the local digital twin, a model update associated with the local digital twin, as described above.

As further shown in FIG. 4, process 400 may include updating, by the global digital twin, the model based on the model update (block 460). For example, the first device may update, by the global digital twin, the model based on the model update, as described above.

In some implementations, process 400 includes receiving a metadata update associated with metadata generated by the local digital twin, and updating a global metadata repository based on the metadata update. In some implementations, process 400 includes receiving a state update associated with a state of the local digital twin, and updating a local twin repository based on the state update. In some implementations, process 400 includes assigning a task to the local digital twin based on characteristics of the task, a type of data associated with the task, and past task executions by the local digital twin.

In some implementations, process 400 includes regulating execution of application processes between the global digital twin and the local digital twin, determining a learning mechanism and a local communication mode of the local digital twin, and determining the communication mode assignment based on the local communication mode of the local digital twin. In some implementations, process 400 includes regulating a data flow between the global digital twin and the local digital twin based on policies.

In some implementations, process 400 includes dividing a learning task into learning subtasks, determining assignments for the learning subtasks based on computation and communication costs associated with the learning subtasks, and assigning each of the learning subtasks to each of a plurality of local digital twins, associated with a plurality of devices, based on the assignments. In some implementations, the plurality of local digital twins are configured to coordinate execution of the learning subtasks to reduce computational overload.

In some implementations, process 400 includes determining a data quality and a data collection rate associated with data communicated with the local digital twins, processing the data quality and the data collection rate, with a Q-learning based model, to determine an optimized policy for data quality management, and updating the data collection rate based on the optimized policy.

In some implementations, process 400 includes providing provisioning data to another local digital twin associated with a third device, receiving, from the local digital twin of the second device, data and an operating state of the third device based on providing the provisioning data, generating another task assignment, for the other local digital twin, based on the data and the operating state, and providing the other task assignment to the other local digital twin.

In some implementations, process 400 includes receiving an update associated with the local digital twin of the second device, and executing the update for the global digital twin of the first device. In some implementations, process 400 includes providing an update, associated with the global digital twin, to the local digital twin to permit the local digital twin to execute the update for the local digital twin.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term “component” is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

providing, by a global digital twin of a first device, a communication mode assignment, of a communication mode, to a local digital twin of a second device, wherein each of the global digital twin of the first device and the local digital twin of the second device includes a constraint repository, a knowledge base, a model repository, an intelligent core, a global metadata repository, and a local twin repository, wherein the model repository of both the global digital twin of the first device and the local digital twin of the second device includes a data structure, the data structure stores a global repository of knowledge and a plurality of models, and wherein the communication mode assignment is provided to cause the local digital twin to communicate with the global digital twin via the communication mode;

generating, by the global digital twin of the first device, a task assignment;

providing, by the global digital twin of the first device, the task assignment to the local digital twin;

updating, by the global digital twin of the first device, at least a model of the plurality of the models based on the task assignment;

receiving, by the global digital twin of the first device and from the local digital twin, a model update of at least a model of the plurality of the models associated with the local digital twin;

updating, by the global digital twin of the first device, at least the model of the plurality of the models based on the model update;

receiving, by the global digital twin of the first device, a metadata update associated with metadata generated by the local digital twin;

updating, by the global digital twin of the first device, a global metadata repository based on the metadata update;

determining, by the global digital twin of the first device, a data quality and a data collection rate associated with data communicated with the local digital twin;

processing, by the global digital twin of the first device, the data quality and the data collection rate, to determine an optimized policy for data quality management;

updating, by the global digital twin of the first device, the data collection rate based on the optimized policy;

providing, by the global digital twin of the first device, provisioning data to another local digital twin associated with a third device, wherein the third device includes a plurality of sensors to collect data, and the local digital twin of the third device provides the sensor data to a queue of a local digital twin of a server;

receiving, by the global digital twin of the first device, data and an operating state of the third device based on providing the provisioning data, from the local digital twin of the second device;

generating, by the global digital twin of the first device, another task assignment, for the other local digital twin, based on the data and the operating state received from the local digital twin of the second device; and providing, by the global digital twin of the first device, the other task assignment to the other local digital twin.

2. The method of claim 1, further comprising:

receiving a state update associated with a state of the local digital twin; and updating a local twin repository based on the state update.

3. The method of claim 1, further comprising:

assigning a task to the local digital twin based on characteristics of the task, a type of data associated with the task, and past task executions by the local digital twin.

4. The method of claim 1, further comprising:

regulating execution of application processes between the global digital twin and the local digital twin;

determining a learning mechanism and a local communication mode of the local digital twin; and determining the communication mode assignment based on the local communication mode of the local digital twin.

5. The method of claim 1, further comprising:

regulating a data flow between the global digital twin and the local digital twin based on policies.

6. The method of claim 1, wherein the global digital twin is provided in a public cloud infrastructure and the local digital twin is provided in an edge server or an end device.

7. A first device, comprising:

one or more memories; and one or more processors, coupled to the one or more memories, configured to:

provide, by a global digital twin of the first device, a communication mode assignment, of a communication mode, to a local digital twin of a second device, wherein each of the global digital twin of the first device and the local digital twin of the second device includes a constraint repository, a knowledge base, a model repository, an intelligent core, a global metadata repository, and a local twin repository, wherein the model repository of both the global digital twin of the first device and the local digital twin of the second device includes a data structure, the data structure stores a global repository of knowledge and a plurality of models, and wherein the communication mode assignment is to cause the local digital twin to communicate with the global digital twin via the communication mode;

generate a task assignment based on constraints and a knowledge base;

provide the task assignment to the local digital twin;

update at least a model of the plurality of the models based on the task assignment;

receive, from the local digital twin, a model update of at least a model of the plurality of the models associated with the local digital twin;

update at least the model of the plurality of the models based on the model update;

receive a metadata update associated with metadata generated by the local digital twin;

update a global metadata repository based on the metadata update;

determine a data quality and a data collection rate associated with data communicated with the local digital twin;

process the data quality and the data collection rate to determine an optimized policy for data quality management;

update the data collection rate based on the optimized policy;

provide provisioning data to another local digital twin associated with a third device, wherein the third device includes a plurality of sensors to collect data, and the local digital twin of the third device provides the sensor data to a queue of a local digital twin of a server;

receive, from the local digital twin of the second device, data and an operating state of the third device based on providing the provisioning data;

generate another task assignment, for the other local digital twin, based on the data and the operating state received from the local digital twin of the second device; and provide the other task assignment to the other local digital twin.

8. The first device of claim 7, wherein the one or more processors are further configured to:

divide a learning task into learning subtasks;

determine assignments for the learning subtasks based on computation and communication costs associated with the learning subtasks; and assign each of the learning subtasks to each of a plurality of local digital twins, associated with a plurality of devices, based on the assignments.

9. The first device of claim 8, wherein the plurality of local digital twins are configured to coordinate execution of the learning subtasks to reduce computational overload.

10. The first device of claim 7, wherein the one or more processors are further configured to:

receive an update associated with the local digital twin of the second device; and execute the update for the global digital twin of the first device.

11. The first device of claim 7, wherein the one or more processors are further configured to:

provide an update, associated with the global digital twin, to the local digital twin to permit the local digital twin to execute the update for the local digital twin.

12. A non-transitory computer-readable medium storing a set of instructions, the set of instructions comprising:

one or more instructions that, when executed by one or more processors of a first device, cause the first device to:

provide, by a global digital twin of the first device, a communication mode assignment, of a communication mode, to a local digital twin of a second device, wherein each of the global digital twin of the first device and the local digital twin of the second device includes a constraint repository, a knowledge base, a model repository, an intelligent core, a global metadata repository, and a local twin repository, and wherein the model repository of both the global digital twin of the first device and the local digital twin of the second device includes a data structure, the data structure stores a global repository of knowledge and a plurality of models;

generate a task assignment based on constraints and a knowledge base;

provide the task assignment to the local digital twin;

update at least a model of the plurality of the models based on the task assignment;

receive, from the local digital twin, a model update of at least a model of the plurality of the models associated with the local digital twin;

update at least the model of the plurality of the models based on the model update;

receive a metadata update associated with metadata generated by the local digital twin;

update a global metadata repository based on the metadata update;

receive a state update associated with a state of the local digital twin;

update a local twin repository based on the state update;

determine a data quality and a data collection rate associated with data communicated with the local digital twin;

process the data quality and the data collection rate to determine an optimized policy for data quality management;

update the data collection rate based on the optimized policy;

provide provisioning data to another local digital twin associated with a third device, wherein the third device includes a plurality of sensors to collect data, and the local digital twin of the third device provides the sensor data to a queue of a local digital twin of a server;

receive, from the local digital twin of the second device, data and an operating state of the third device based on providing the provisioning data;

generate another task assignment, for the other local digital twin, based on the data and the operating state received from the local digital twin of the second device; and provide the other task assignment to the other local digital twin.

13. The non-transitory computer-readable medium of claim 12, wherein the one or more instructions further cause the first device to:

assign a task to the local digital twin based on characteristics of the task, a type of data associated with the task, and past task executions by the local digital twin.

14. The non-transitory computer-readable medium of claim 12, wherein the one or more instructions further cause the first device to:

regulate execution of application processes between the global digital twin and the local digital twin;

determine a learning mechanism and a local communication mode of the local digital twin; and determine the communication mode assignment based on the local communication mode of the local digital twin.

15. The non-transitory computer-readable medium of claim 12, wherein the one or more instructions further cause the first device to:

regulate a data flow between the global digital twin and the local digital twin based on policies.

16. The non-transitory computer-readable medium of claim 12, wherein the one or more instructions further cause the first device to:

divide a learning task into learning subtasks;

determine assignments for the learning subtasks based on computation and communication costs associated with the learning subtasks; and assign each of the learning subtasks to each of a plurality of local digital twins, associated with a plurality of devices, based on the assignments.

17. The non-transitory computer-readable medium of claim 12, wherein the optimized policy for the data quality management is determined, via a Q learning based model, based on the data quality and the data collection rate, wherein the Q-learning based model is assigned with a task to provide the data quality management for link quality estimation between the first device and the second device.

18. The non-transitory computer-readable medium of claim 12, wherein the data quality is categorized into three levels comprising high, medium, and low, and measured based on a standard error associated with estimation of parameters of a data distribution of a plurality of link quality estimators.

19. The method of claim 1, wherein the optimized policy for the data quality management is determined via a Q learning based model, based on the data quality and the data collection rate, wherein the Q-learning based model is assigned with a task to provide the data quality management for link quality estimation between the first device and the second device.

20. The method of claim 1, wherein the data quality is categorized into three levels comprising high, medium, and low, and measured based on a standard error associated with estimation of parameters of a data distribution of a plurality of link quality estimators.

* * * * *